April 25, 1933.   S. S. REISHUS   1,906,127
WEED AND FOUL SEED DESTROYING MACHINE
Filed May 9, 1932   3 Sheets-Sheet 3

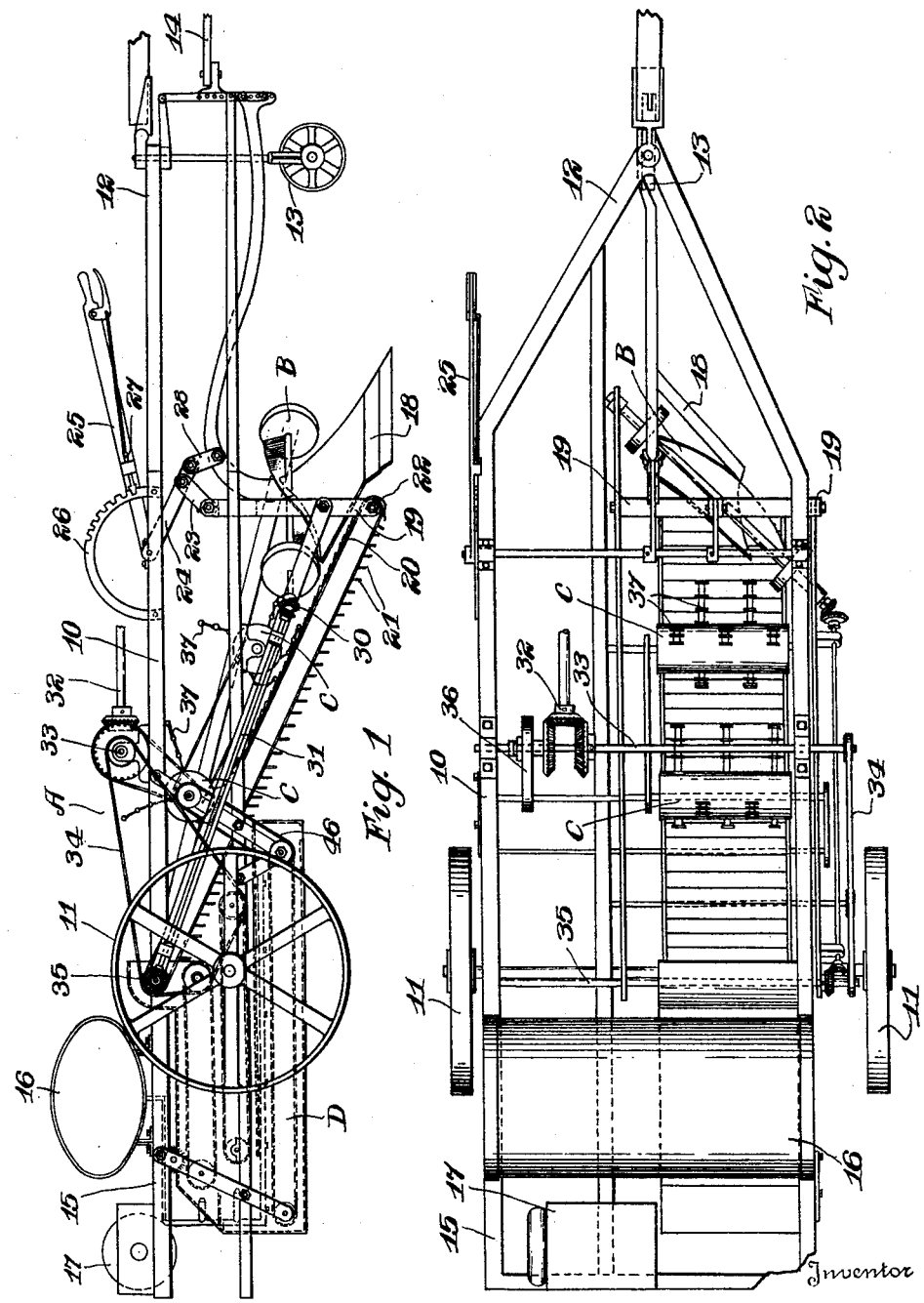

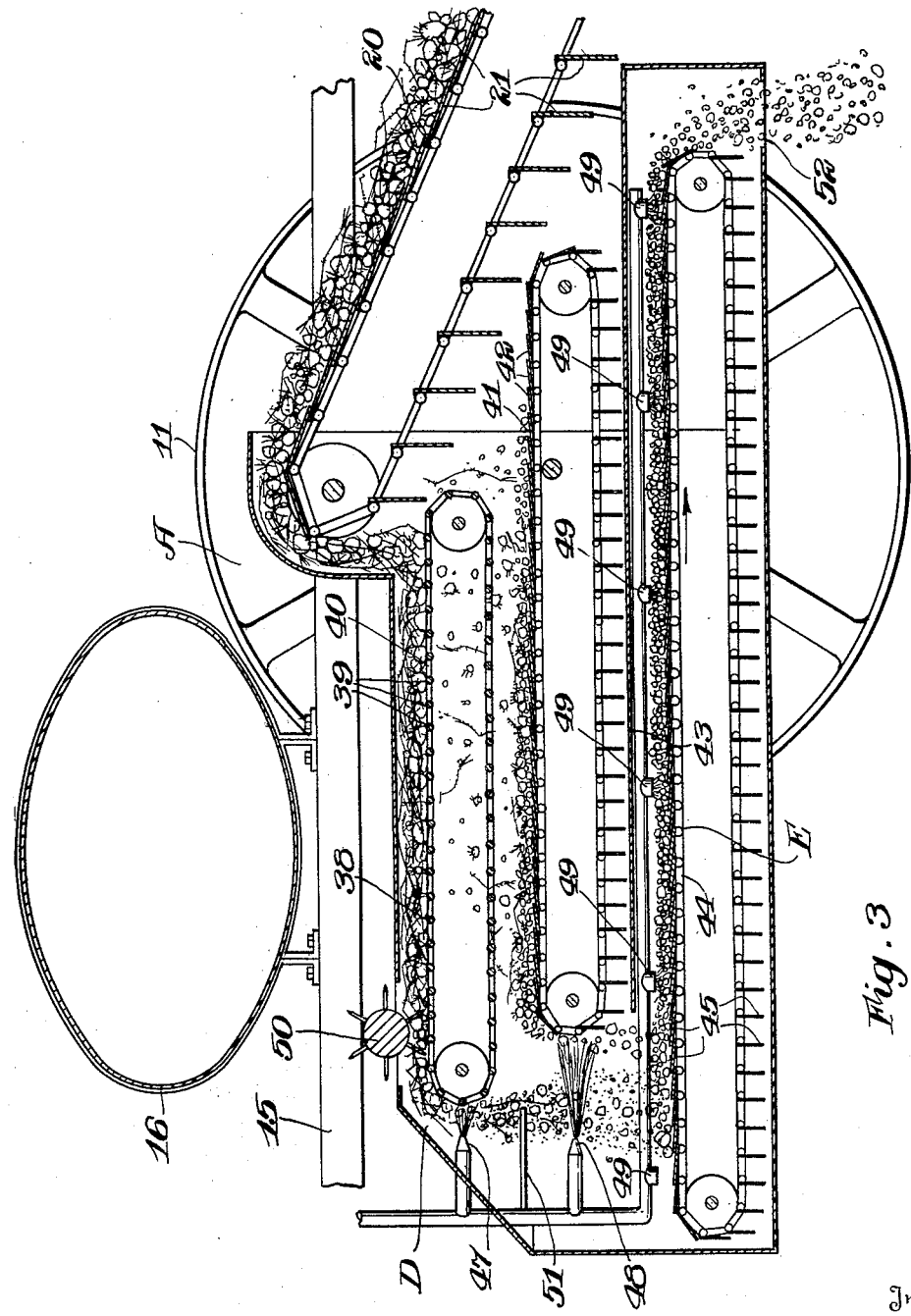

Inventor
Sondre S. Reishus
By Howard Fischer
Attorney

Patented Apr. 25, 1933

1,906,127

UNITED STATES PATENT OFFICE

SONDRE S. REISHUS, OF VALLEY CITY, NORTH DAKOTA, ASSIGNOR OF ONE-HALF TO HARRY A. GILBERTSON, OF VALLEY CITY, NORTH DAKOTA

WEED AND FOUL SEED DESTROYING MACHINE

Application filed May 9, 1932. Serial No. 610,056.

My invention relates to a weed and foul seed destroying machine and is designed to be operated to carry the roots with the weeds and the foul seeds up into the machine, pulverizing the soil and carrying the weeds, foul seeds and roots on through the machine in a manner so as to subject the same to open flame by a heating means to destroy the weeds and seeds of the same as well as to kill the roots before being redeposited back onto the ground upon leaving my machine.

A feature resides in a weed destroying machine wherein a suitable adjustable plow is associated with a reel in a manner so that the dirt, weeds, roots and seeds are urged or pushed up onto the conveyor which is positioned in relation to the plow so as to carry the dirt cut up by the plow onto the conveyor and carry it on up into the machine.

It is also a feature to provide suitable beater means as associated with the first carrying conveyor of the machine in the form of link chains which rotate around and beat against the soil and weeds carried up on this first conveyor.

My machine includes a means wherein a second conveyor is provided having a nature to permit the earth or soil to sift through the same while the weeds, roots and seeds may be carried back and subjected to an open flame in a manner so that they must pass virtually through the flame before being carried to another conveying means in the machine. At this point I provide means for retarding the falling of the weeds and roots through the flame. Just before the weeds, seeds and roots are carried by the open rod conveyor to the flame, I provide a beater to break up any clods which may be carried over as far as the beater. This permits the machine to carry virtually only weeds, roots and seeds through the first flame with the exception of possibly small particles of dirt which may cling to the same.

It is a feature to provide a slatted conveyor below the open rod conveyor which travels in the same direction as the open rod conveyor so as to carry the material falling on the slatted conveyor through the superimposed open rod conveyor toward a second flame through which the material passes from this conveyor, as well as the material which falls past the first flame, thereby burning the material with these double flames before it drops onto the final conveyor.

The machine includes means of providing a final slatted conveyor which is adapted to carry the material on this slat conveyor under a series of flames maintained in a heating chamber extending along the lower portion of the machine and running in a direction toward the front of the machine so as to discharge the soil, burnt weeds, seeds and roots, or what remains of them, out onto the ground or back into the furrow made by the plow. With my machine the weeds, seeds and roots are reduced to virtually ashes while the earth is broken up and pulverized and heated to kill any germination of an undesirable nature in the same. Thus I provide a machine simple in operation and very desirable for eliminating weeds, foul seeds and roots which cannot be destroyed except by killing the life in the same. The machine operates by take-off power from a tractor or other suitable means and the plow is adjustable as a unit with the conveyor and reel to carry the same in the desired position in the operation of the machine. The burner means may be of a fuel oil nature operable under pressure so as to provide a hot clean flame which will quickly kill the life of this undesirable vegetation as hereinbefore pointed out.

The details, objects and features will be fully defined.

In the drawings forming part of this specification:

Figure 1 is a side view of my foul seed and weed destroying machine, showing the same in operative position.

Figure 2 is a plan view of the same.

Figure 3 is an enlarged detail partially in section of the rear portion of the machine.

Figure 4:
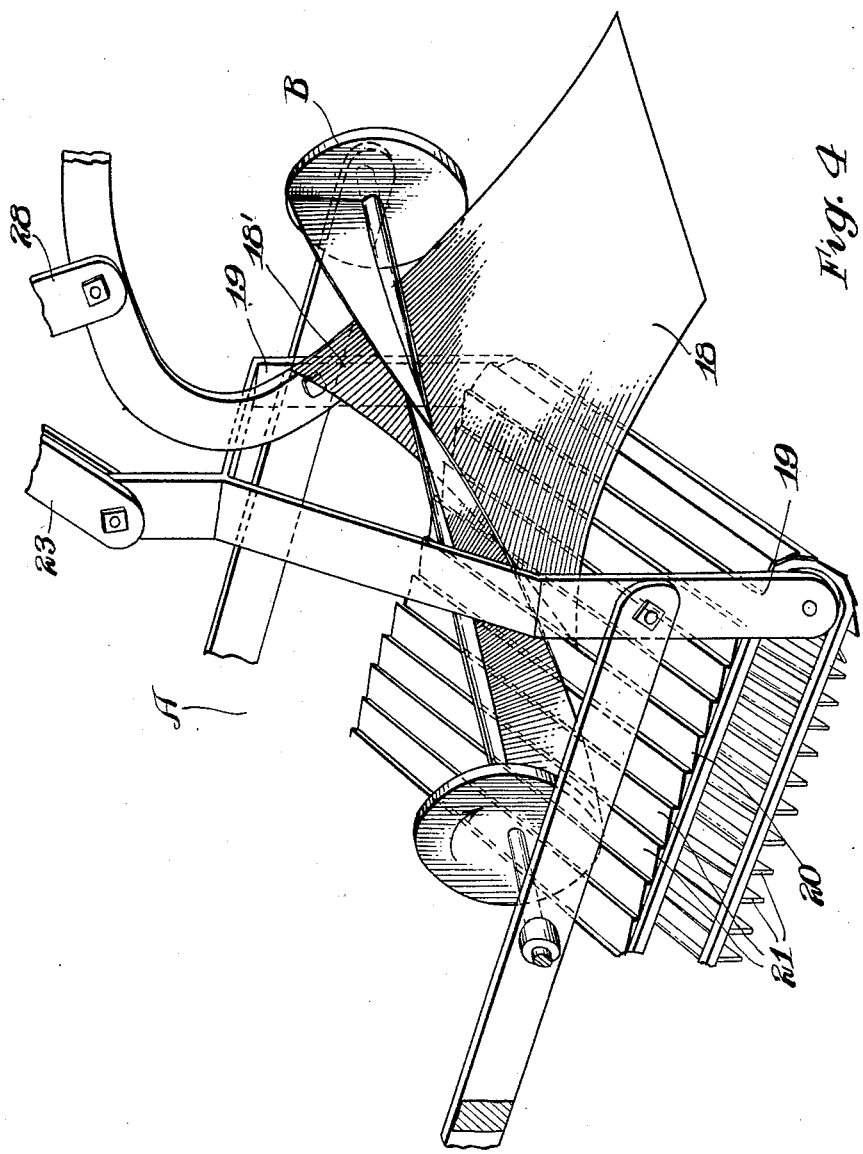
Figure 4 is an enlarged perspective detail of the front end of the primary conveyor, plow and reel.

My weed and foul seed destroyer A is provided with a frame 10 which is supported at the rear by the wheels 11 and the front portion 12 of the frame is carried on the caster wheel 13. A guide pole 14 extends from the front portion 12 to any suitable means of pulling the machine A.

The frame 10 may be made of any suitable shape and design and probably preferably of angle iron so as to extend back beyond the wheels 11 with the frame portion 12 which is adapted to support a fuel supply tank 16 and a suitable fuel oil burner 17. The wheels 11 are positioned on either side of the frame 10 as illustrated in Figure 2, so as to support the rear end of the frame 15 firmly and to carry it along over the ground in operation.

I provide a plow 18 which is carried beneath the front end 12 by the frame members 19. The members 19 also support the front end of the primary conveyor 20 so that the front end of the conveyor is held adjacent and in close proximity to the plow 18 to facilitate the carrying of the dirt raised by the plow directly onto the front end of the primary conveyor. The conveyor 20 is formed of metal slats 21 which form a flexible conveying means which is adapted to form a closed conveying platform on the top while the blades 21 of the conveyor may hang free on the under side of the same while this portion of the conveyor travels toward the front pivot portion 22 on the frame or members 19. The frame members 19 are connected by the links 23 to the operating lever 24 which is adapted to be operated by the hand lever 25. A locking quadrant 26 is adapted to hold the hand lever 25 in the proper operating position by means of the hand operated catch 27. Thus when the lever 25 is operated the conveyor may be raised and lowered into the desired position. This is also true of the plow 18 which is connected by the operating link 28 to the operating lever 24. Thus the plow 18 and the front end of the conveyor 20 are operated in unison by the lever 25 to raise and lower the same when it is desired.

The reel B is placed just ahead and above the mold board 18' of the plow 18 in such a position that it will assist in moving the soil, weeds, roots and seeds to push it backward onto the primary conveyor 20. The reel B is angularly disposed and is driven by suitable gears 30 which are driven by the drive shaft 31. The reel B is constructed and positioned with reference to the plow and primary conveyor so that the plow, conveyor and reel are all moved simultaneously by the operating lever 25.

A power take-off shaft 32 is adapted to drive the counter shaft 33 which in turn drives the chain belt 34 to drive the counter shaft 35 at the upper end of the primary conveyor 20. This shaft 35 drives the shaft 31 to operate the reel B when the weed destroyer A is in operation. The power take-off shaft 32 may be operated by any suitable source of power and if desired the power may be obtained from the tractor which is connected to the driven tongue 14 so as to supply power for operating the working parts of the weed destroyer A. The tractor is not illustrated in the drawings and it is obvious that any suitable source of power may be employed even in a separate power unit carried by the frame of the weed destroyer A if it is desired.

A pair of beaters C are positioned above the primary conveyor 20 and are adapted to be operated by the chain belt 36 from the shaft 33. These beaters may be in drum formation with a series of beating chains 37 which are carried around and forced against the weeds and roots in a manner to beat the soil off from the same and to break up the clods of dirt.

The weed destroyer A is provided with a burning compartment D positioned at the rear end of the frame 15 and partially extending below the primary conveyor 20. This burning compartment is inclosed with sheet metal and is provided with a series of superimposed conveyors, the upper one 38 of which is formed with transverse rods 39 extending between the side operating chains 40. Directly below the conveyor 38 is an intermediate conveyor 41 formed with overlapping slats 42 similar to the overlapping slats 21 in the primary conveyor 20. The lower portion of the compartment D is divided by the baffle plate 43 to provide an auxiliary burning chamber E in which the lower conveyor 44 operates. The lower conveyor 44 is made with the overlapping steel slats 45 on the top, the same as the primary conveyor and the intermediate conveyor in the burning chamber D. The conveyors 38 and 41 are driven by the chain 34 as illustrated in Figure 1, while the conveyor 44 is driven by the chain 46. These chains are operated from the transverse shaft 33. This drives the conveyors which are, respectively, the primary conveyor 20, the rod conveyor 38, the intermediate conveyor 41, and the lower conveyor 44.

The fuel supply tank 16 is adapted to supply the necessary fuel oil to the rotating burner member 17 which operates under pressure to provide an open flame at the flame nozzles 47 and 48, which are positioned at the rear of the burning chamber D and the series of flame nozzles 49 positioned along the chamber E beneath the baffle plate 43. The series of flame nozzles 49 are positioned above the upper surface of the conveyor 44 and are adapted to direct a flame toward the same. A beater 50 is positioned above and at the rear of the rod conveyor 38 in the burning compartment D which is adapted to break up any clod of soil or dirt carried on the open rod conveyor which does not pass through the same.

In operation the weed destroyer A is designed to be pulled over the ground where the soil is infested with foul weeds and seeds or other vegetation which it is desired to destroy. The plow 18 is let down to the desired depth to plow the soil up onto the primary conveyor 20. This conveyor carries the same with the weeds and roots together with the foul seeds and a certain amount of the soil on up the primary conveyor beneath the beater C and discharges the same onto the top or rod conveyor 38. This carries the weeds and roots back toward the rear of the burning compartment D and practically all of the soil is carried through the conveyor 38, dropping down onto the intermediate conveyor 41. As the weeds and roots thereof together with any other vegetation and seeds pass from the rear end of the conveyor 38, they are passed through the flame of the nozzle 47. Retarding rods 51 retard the falling vegetation and permit the flame 48 to burn up the same and destroy it. In falling from the flame of the nozzle 47 the material is caused to pass through the flame from the nozzle 48. The nozzle 47 is directed toward the end of the conveyor 38, while the end of the nozzle 48 is directed toward the rear end of the conveyor 41. Thus as the material and soil drop from the conveyor 38 it is caused to again pass through the flame of the nozzle 48. In passing this point the material is carried onto the final or lower conveyor 44 which is made of overlapping steel slats and as the material passes along this conveyor it is in a sense superheated by the series of burners 49. In this manner the vegetation is reduced to ashes and is mixed with the soil which is heated sufficiently to destroy all germination and undesirable foul seeds or other objectionable life in the soil. However, the soil is not heated to destroy the properties thereof or to injure its usefulness in raising crops from the same. As the soil and ashes are carried by the conveyor 44 forwardly beneath the rear end of the conveyor 20 it is adapted to fall out through the opening 52 and be deposited back into the furrow cut by the plow 18.

The operation of my weed and foul seed destroyer is simple, yet it is effective to accomplish the results of destroying undesirable weeds and roots, burning the same and completely killing the life therein, so that it cannot regerminate once it has passed through my destroyer A. The top soil is also treated to kill any larva or other animal life, leaving the soil redeposited onto the ground clean and ready to be used for whatever crops desired.

I have found my weed destroyer to operate rapidly and successfully to wipe out weeds having roots which are very difficult to destroy and to accomplish the results desired in a very practical manner.

In accordance with the patent statutes I have described the principles of my weed and foul seed destroying machine and I have endeavored to represent the best embodiment thereof. It is apparent, however, that the illustrations are diagrammatic and that variations may be made and uses employed within the scope of the following claims within the purpose of the invention.

I claim:

1. A weed and foul seed destroying machine including, a plow, a primary slat conveyor having one end extending in close proximity to said plow, a reel adjacent said plow and the front end of said primary conveyor to push the sod and weeds onto said conveyor, means for simultaneously raising and lowering said plow and the front end of said conveyor into and out of operating position, a series of secondary conveyors including an open rod conveyor, a slatted conveyor below said open rod conveyor, and a final slatted conveyor, and burner means associated with said last named conveyors positioned in a manner to burn and destroy vegetable matter, seeds and roots, said last conveyor of said series discharging the soil and ash in virtually pulverized form back on the ground.

2. A weed and foul seed destroying machine including, an adjustable plow for elevating the turf and soil, a conveyor for receiving the elevated turf and soil with the weeds and seeds, a power take-off means for operating said conveyor, a series of superimposed elevators onto which said first conveyor is adapted to discharge the soil, weeds and foul seeds, means for operating the top pair of elevators in the same direction, and a unitary fuel oil burner having a series of flames through which the weeds, foul seeds and soil are adapted to pass in a manner to kill the weeds, seeds and vegetation life in the soil elevated by said plow.

3. A weed and foul seed destroying machine including, means for elevating the weeds and foul seeds off of the ground, means for conveying the weeds and seeds from the elevating means to carry the same back and forth while any soil connected therewith is broken up and pulverized, a series of conveyors in said conveying means travelling in the same direction, one conveyor receiving the material passing through the conveyor above, and burner means having open flame means through which the weeds and seeds are adapted to pass while being carried back and forth by said conveyor means, whereby the vegetation and animal life are killed and the weeds and seeds are destroyed to ashes before they are discharged from said machine with the soil which passed into said machine in the elevation of the weeds and seeds.

4. A device of the class set forth including, an elevating means having a plow for cutting into the earth and raising the weeds and seeds including the roots of foul vegetation, a reel associated with said plow for assisting in clearing the same to carry the soil with the weeds and seeds into said machine, a conveyor having slats for forming a closed platform onto which the soil with the weeds and seeds are carried, beaters for pounding the soil, weeds and seeds as it is carried up said conveyor, means for elevating said plow and the forward end of said conveyor simultaneously and to adjust the operation of the same, power take-off means for operating said conveyor and said reel, a series of superimposed conveyors positioned backwardly of said first conveyor and adapted to receive the soil, weeds and seeds in a manner to separate the soil from the weeds and seeds, means for passing the weeds and seeds directly through a flame of fire while carried back and forth by said secondary conveyor, and a burning compartment having a series of flames therein and a conveyor adapted to be positioned beneath said flames to cause the weeds and seeds to be entirely consumed and the soil which was picked up with the weeds and seeds thoroughly heated by said series of flames to kill any germ life therein before the same is redeposited onto the ground.

5. A vegetation destroyer for killing weeds and foul seeds and germ life in soil picked up with the same including, a cutting and elevating plow, a primary conveyor made up of a series of slats, power take-off means for operating said conveyor, beaters associated with said conveyor for beating the soil from the weeds and seeds, reel means for carrying the weeds and seeds with the soil back onto said conveyor from said plow, and a series of auxiliary conveyors confined within a heating cabinet wherein open flames are directed against the weeds and seeds and the soil carried with the same to destroy all of the vegetation life and germination and redeposit the soil with the ashes of the weeds and seeds back onto the ground.

6. A weed destroyer including, means for cutting into the ground to raise the weeds, roots and all into said machine, a conveyor associated with said cutting and elevating means, a reel for assisting in conveying the weeds with the roots and soil clinging thereto onto said conveyor, power take-off means for operating said conveyor and reel, and adjustable means for raising the forward end of said conveyor with said reel and soil cutter, and a burner for burning up the weeds and the roots thereof associated with the rear of said conveyor and having conveying means adapted to carry the weeds and roots directly through open flames and to subject the soil passing therethrough to the open flames, whereby the weeds and roots, as well as the soil, are heated to destroy the vegetation life and germination before the soil and ash of the weeds and roots are deposited back onto the ground.

7. A machine of the class described including, means for cutting into the ground and elevating the same with the vegetation like weeds, seeds and grass with the roots and the soil adhering thereto, means for beating and disintegrating the soil from the weeds, grass, roots and seeds, conveyor means traveling in parallel relationship for conveying the weeds, grass, seeds and roots with the soil adhering thereto into a heating compartment, said conveyor means comprising a series of grading conveyors for material of different sizes, and a series of open flames directed in a manner to burn up and destroy the vegetation and germ life and to redeposit the ash thereof with the earth back onto the ground.

8. A weed destroying machine including, a plow, means for raising and lowering said plow, a reel associated with said plow for assisting the plow in carrying the soil with the weeds and roots thereof away from the rear of said plow, a primary conveyor having its forward end in close proximity to said plow and reel and adapted to receive the weeds and roots with the adhering soil, a series of beaters for pulverizing the soil as it passes along said primary conveyor, power take-off means for operating said conveyor, and a series of conveyors associated with said primary conveyor and operated by said power take-off means positioned within a heating compartment wherein the weeds, seeds, roots and soil carried into the same are heated to kill the vegetation and germ life therein, and to redeposit the residue out onto the ground.

9. A machine of the class described including, a frame, a plow for cutting and elevating soil with weeds, roots and seeds of vegetation, an angularly disposed clearing reel associated with the rear of said plow, a conveyor having its forward end in close proximity to and operable with said plow, means for raising and lowering said conveyor, plow and reel in a unit, a burning compartment having open flames therein, a series of conveyors within said burning compartment, means for supplying fuel to said burning compartment, said first conveyor being associated with said burning compartment and the conveyors therein to carry the weeds, roots and seeds with the adhering soil into said burning compartment where the vegetation and germ life is entirely destroyed by the open flame, and power take-off means for operating said conveyors and reel.

10. A weed and root destroying machine including, a frame, a plow for elevating the weeds and roots, an angularly disposed reel for carrying the weeds and roots with the clinging earth into said machine from said plow, a conveyor associated with said plow and reel, means for operating said conveyor, a burning compartment for utterly destroying the weeds and roots and killing any germ life in the soil carried into said machine, and means for simultaneously operating said plow, reel and conveyor into and out of operation.

11. A weed destroyer including, a plow, a reel for carrying the weeds and soil from said plow, an overlapping steel slat conveyor for carrying the weeds and soil from said plow and reel, means for driving said conveyor, a series of auxiliary conveyors, a metal compartment for inclosing said auxiliary conveyors, beaters for breaking up the soil as it is carried up the first conveyor, beater means associated with said auxiliary conveyors, and a series of burning flames positioned in a manner to cause the weeds and roots to pass through the same in said metal compartment to entirely destroy the weeds and roots before being discharged from said metal compartment back onto the ground.

12. A vegetation destroying apparatus designed primarily to destroy weeds, seeds, grass and fine roots including, plow means for cutting the top soil from the ground with the weeds, roots and seeds therein, an angularly disposed reel for forcing said soil from said plow means, conveyor means for elevating the same, means for breaking up the soil as it is carried up into said apparatus, and means for subjecting the weeds, roots and seeds to a series of open burning flames and redepositing the soil and ashes in the refined state on the ground.

SONDRE S. REISHUS.